(No Model.)

C. E. L. BROWN.
SYNCHRONOUS SINGLE PHASE MOTOR.

No. 552,313. Patented Dec. 31, 1895.

Witnesses:
Marion Hall
H. Obermayer

Inventor:
C. E. L. Brown
by Goepel & Raegener
Attorneys.

UNITED STATES PATENT OFFICE.

CHARLES EUGEN LANCELOT BROWN, OF BADEN, SWITZERLAND.

SYNCHRONOUS SINGLE-PHASE MOTOR.

SPECIFICATION forming part of Letters Patent No. 552,313, dated December 31, 1895.

Application filed February 6, 1893. Serial No. 461,253. (No model.)

*To all whom it may concern:*

Be it known that I, CHARLES EUGEN LANCELOT BROWN, a subject of the Queen of England, residing at Baden, in the Canton of Aargau, in the Republic of Switzerland, have invented certain new and useful Improvements in a Synchronous Motor for Single-Phase Alternate Currents with Special Collectors for Starting, of which the following is a specification.

The purpose of the present invention is the construction of synchronous-running motors for single-phase alternate currents starting easily and against a load. Such a motor consists principally of two parts, a fixed winding bedded in iron directly connected to the mains and a second rotating winding also bedded in iron and connected with two collectors. Of these one has a considerable number of segments while the other is simply a collector with an equal number of segments as the machine has poles; or else the second winding may be fixed and the first winding rotating.

Figure 5:
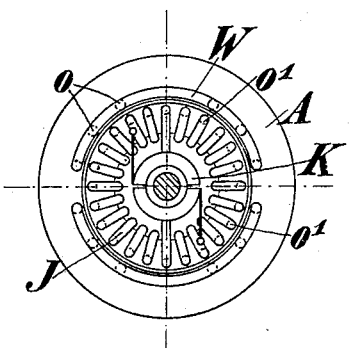
Figure 6:
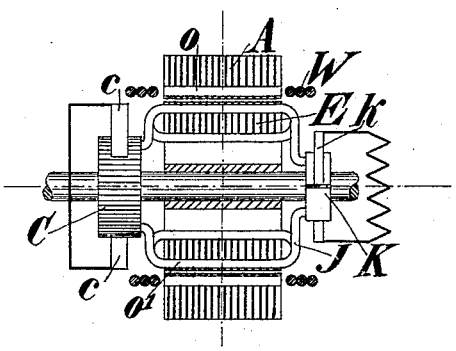

In the accompanying drawings, Figures 1, 2, 3, and 4 are diagrammatic views of my improved synchronous motor for single-phase alternating currents with special collectors for starting. Fig. 5 is an end view partly in section of one construction of said motor. Fig. 6 is a vertical longitudinal sectional view of the same.

Similar letters of reference indicate like parts in all the drawings.

It is advisable to provide the smallest possible air-gap between the said two windings. Instead of the deeply-serrated cores hitherto used, all the iron in the machines is arranged with a surface containing as many holes or as slightly serrated as possible. (See O and O', Figs. 5 and 6.)

The collector with the greater number of segments serves for starting the motor and as soon as synchronism is reached is switched out and during synchronous running the commutator with few parts serves to change the alternate currents supplied to the machine into direct current for exciting the field-magnets.

The actions which cause the motor to start are as follows: At a certain position of the brushes on the multiple part or starting collector, poles are produced in the rotating part which, by their position with regard to the outer poles of the fixed part, produce a turning movement which starts the motor. Where synchronism has been attained the commutator with few parts comes into action and provides the inner winding with a commutated current which insures the continuance of synchronous running. An arrangement in accordance with these principles is shown in Figs. 5 and 6. Fig. 5 shows the two-part commutator corresponding to the two-part arrangement. The motor may, of course, be also arranged with a multipolar field.

A is the fixed laminated iron core carrying the winding W in holes near its inner edge. The arrangement of the winding is similar to that of a drum-armature, but might, of course, equally well have been arranged as a ring. The rotating laminated iron core E has, too, a winding J carried either in holes or slots, which is here shown as a ring winding, and carries on one side the collector C with many segments and on the other the two-part collector K. On the former press the two brushes $c\ c$ and on the latter the two brushes $k\ k$.

This motor may now be connected in various different ways, of which some are shown in Figs. 1, 2, 3 and 4 and which also allow of various combinations among themselves.

Figure 1:
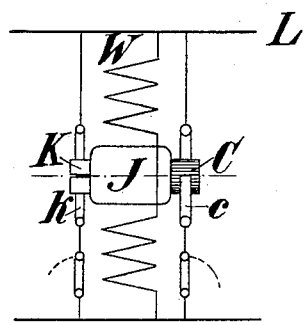

In Fig. 1 the brushes $c$ of the collector are directly connected with the mains L L from which they receive current similarly to the fixed part. The collector K is also similarly connected.

Figure 2:
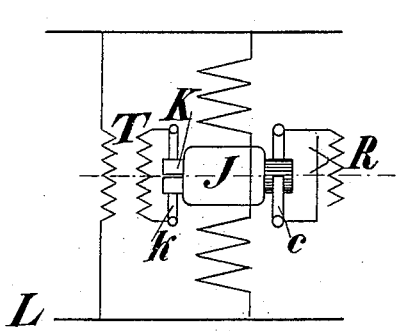

In Fig. 2 the collector-brushes $c$ are in no direct connection with the mains but are short-circuited through the adjustable resistance R. The current, in this case, is induced by the outer part but the action is substantially as before. The collector K is here supplied with current from the transformer T.

Figure 3:
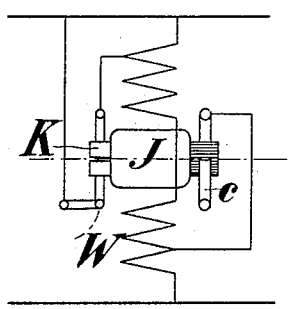

In Fig. 3 the collector-brushes $c$ are arranged as a shunt to a certain number of turns of the outer fixed winding W. The brushes of the collectors are also similarly connected. Finally, in Fig. 4, the connections are so arranged that at starting the fixed and rotating parts are in series, but as soon as synchronism is attained they are changed by means of the simple switch V to the working arrangement. The collector K is here supplied with current from a second winding inserted between the convolutions $w$ of the main fixed winding W.

Figure 4:
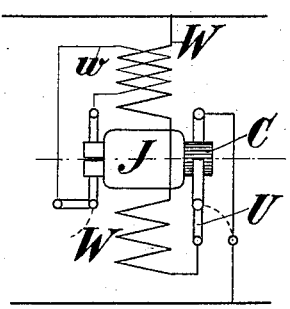

It will be readily understood that the connection of the many-part collector C, as shown in Fig. 2, may be combined with the connection of the few-part collector K, Figs. 1, 3 and 4, and that in a similar manner the connections of the collectors may be increased by suitable permutations.

Having thus described my invention, what I claim as new, and desire to secure by Letters Patent, is—

In an electric-motor, the combination, with a stationary winding, of a rotating winding, two collectors each connected directly with the rotating winding, and of which one is a multiple-part collector and the other a few-part collector, having as many parts as the machine has poles, the first collector being adapted to be thrown out of action when starting the motor, whereas the second collector serves to act only when synchronism is reached, a pair of brushes in contact with each collector, and proper electrical connections for said brushes.

In testimony whereof I hereunto sign my name, in the presence of two subscribing witnesses, this 28th day of December, 1892.

CHARLES EUGEN LANCELOT BROWN.

Witnesses:
EMIL BLUM,
H. LABBART.